(12) United States Patent
Alves et al.

(10) Patent No.: US 8,189,767 B2
(45) Date of Patent: May 29, 2012

(54) METHOD AND SYSTEM FOR CLEAR SIGNAL CAPTURE

(75) Inventors: Rogerio G. Alves, Windsor (CA); Kuan-Chieh Yen, Northville, MI (US)

(73) Assignee: Clarity Technologies, Inc., Auburn Hills, MI (US)

( * ) Notice: Subject to any disclaimer, the term of this patent is extended or adjusted under 35 U.S.C. 154(b) by 920 days.

(21) Appl. No.: 12/195,831

(22) Filed: Aug. 21, 2008

(65) Prior Publication Data

US 2008/0310643 A1   Dec. 18, 2008

Related U.S. Application Data

(62) Division of application No. 10/914,898, filed on Aug. 10, 2004, now Pat. No. 7,433,463.

(51) Int. Cl.
*H04M 9/08* (2006.01)

(52) U.S. Cl. ......... 379/406.08; 379/406.12; 379/406.14

(58) Field of Classification Search ............ 379/406.08, 379/406.12, 406.14

See application file for complete search history.

(56) References Cited

U.S. PATENT DOCUMENTS

| | | | |
|---|---|---|---|
| 5,937,060 | A | 8/1999 | Oh |
| 6,125,179 | A | 9/2000 | Wu |
| 2004/0071284 | A1 | 4/2004 | Abutalebi et al. |
| 2004/0218755 | A1 | 11/2004 | Marton et al. |
| 2005/0129225 | A1* | 6/2005 | Piket et al. ............... 379/406.01 |
| 2005/0131678 | A1 | 6/2005 | Chandran et al. |
| 2010/0266118 | A1* | 10/2010 | Thi et al. .................. 379/406.08 |

OTHER PUBLICATIONS

Jeannes et al., "Combined Noise and Echo Reduction in Hands-Free Systems: A Survey," IEEE Transactions on Speech and Audio Processing, vol. 9, No. 8, Nov. 2001, pp. 808-820.
Schnaufer et al., "New Data-Reusing LMS Algorithms for Improved Convergence," IEEE Conf. on Signals, Systems and Computers, 27th Asilomar Conf. ACSSC 1993, Nov. 1-3, 1993; vol. 2, pp. 1584-1588.
Benesty et al., "On Data-Reuse Adaptive Algorithms," Intl. Workshop on Acoustic Echo and Noise Control (IWAENC 2003), Sep. 2003, Kyoto, Japan, pp. 31-34.
Chen, "Analysis of the Fast Data-Reuse NLMS Algorithm," 1993, Dept. of Computer and Communication Engineering, Chienko Technology University (English Abstract attached (p. 3)).
Gustafsson et al., "Combined Acoustic Echo Control and Noise Reduction for Mobile Communications," 5th European Conference on Speech Communication and Technology, Eurospeech '97, Rhodes, Greece, Sep. 22-25, 1997, European Conference on Speech Communication and Technology (Eurospeech), Grenoble: Esca, FR, vol. 3 of 5, Sep. 22, 1997, pp. 1403-1406.
Martin et al., "Coupled Adaptive Filters for Acoustic Echo Control and Noise Reduction," Proceedings ICASSP 95, May 1995, pp. 3043-3046.
Scalart et al., "A system for speech enhancement in the content of hands-free radiotelephony with combined noise reduction and acoustic echo cancellation," Speech Communication, Elsevier Science Publishers, Amsterdam, NL, vol. 20, No. 3-4, Dec. 1996, pp. 203-214.

(Continued)

*Primary Examiner* — Gerald Gauthier
*Assistant Examiner* — Simon King
(74) *Attorney, Agent, or Firm* — Brooks Kushman P.C.

(57) ABSTRACT

A method and system for clear signal capture comprehend several individual aspects that address specific problems in improved ways. In addition, the method and system also comprehend a hands-free implementation that is a practical solution to a very complex problem. Individual aspects comprehended related to echo and noise reduction, and divergence control.

4 Claims, 7 Drawing Sheets

OTHER PUBLICATIONS

Faucon et al., Echo and Noise Reduction for Hands-Free Terminals—State of the Art—, 5th European Conference on Speech Communication and Technology, Eurospeech '97, Rhodes, Greece, Sep. 22-25, 1997, European Conference on Speech Communication and Technology (Eurospeech), Grenoble: Esca, FR, vol. 5 of 5, Sep. 22, 1997, pp. 2423-2426.

* cited by examiner

METHOD AND SYSTEM FOR CLEAR SIGNAL CAPTURE

BACKGROUND OF THE INVENTION

1. Field of the Invention

The invention relates to a method and system for capturing signals and to associated signal processing techniques. This invention further relates to a method and system for hands free operation of mobile or non-mobile phones.

2. Background Art

In any system for capturing signals, the goal is to capture the desired signal while rejecting undesired signals. Signal processing techniques are employed to process a received input signal to enhance the desired signal while removing the undesired signals.

One particular problem faced in systems for hands free operation of mobile or non-mobile phones is the acoustic echo cancellation (AEC) problem. The AEC problem is a well known problem, and it can be described as shown in FIG. 1, where the far-end received signal (x(n)) is sent to a loud speaker inside of a car (for example). This signal is propagated by the interior of the automobile through the acoustic path (q(n)), and is fed back into the microphone generating the echo signal (c(n)). To cancel the echo signal an adaptive filter is used, where the objective is to identify the acoustic echo path (q(n)) with the adaptive filter (g(n)), and then to subtract the resultant signal (y(n)) from the microphone signal. If (g(n)=q(n)) then (y(n)=c(n)), and the subtraction of the output signal of the adaptive filter from the microphone signal will cancel the echo signal.

This AEC problem has been addressed in existing applications by using different types of adaptive filter algorithms such as least mean square algorithm (LMS), normalized least mean square algorithm (NLMS), data reuse normalized least mean square algorithm (DRNLMS), recursive least square algorithm (RLS), affine projection algorithm (APA), and others.

Another related problem is that an adaptive filter algorithm needs some type of control to prevent the divergence of the algorithm when far-end send and near-end receive signals are present at the same time.

This divergence problem has been addressed in existing applications by introducing a double talk detector (DTD). The DTD restricts the conditions under which the adaptive filter algorithm may adapt.

One particular requirement of any system is that the system must perform well in the presence of a noise signal (v(n)). In attempts to meet this requirement, a noise cancellation algorithm (NC) has been introduced. Various different approaches have been taken for implementing the NC algorithm including approaches based on spectral subtraction, Kalman filters, neural networks, and others.

In another aspect, existing applications have introduced a non-linear processor (NLP). The NLP attempts to compensate for the practical problem of the adaptive filter algorithm not achieving its minimum mean square error (MSE) and for system non-linearity particularly where one of the sources is the non-linear loud speaker.

Overall, existing applications have taken a variety of approaches to address acoustic echo, adaptive algorithm divergence, noise, and system non-linearity. The initial problem of acoustic echo cancellation has developed into an evolving complex problem involving a number of different design aspects. Although various approaches have been taken in addressing specific issues, the overall evolving complex problem has yet to be fully addressed.

Background information may be found in S. Haykin, *Adaptive Filter Theory*, Prentice Hall, Upper Saddle River, N.J., 4th Edition, 2002; P.S.R. Diniz, *Adaptive Filtering—Algorithms and Practical Implementation*, Kluwer Academic Publishers, Dordrecht, The Netherlands, 2nd Edition, 2002; P. P. Vaidyanathan, *Multirate Systems and Filter Banks*, Prentice Hall Signal Processing Series, Englewood Cliffs, N.J., 1993; R. E. Crochiere, L. R. Rabiner, *Multirate Digital Signal Processing*, Prentice Hall, Englewood Cliffs, N.J.; S. T. Gay, J. Benesty, *Acoustic Signal Processing for Telecommunication*, Kluwer Academic Publishers, Dordrecht, The Netherlands, 2000; S. F. Boll, "Suppression of acoustic noise in speech using spectral subtraction," *IEEE Trans. Acoust., Speech, Signal Proc.*, vol. ASSP-27, April 1979; R. B. Jeannes, P. Scalart, G. Faucon, C. Beaugeant, "Combined noise and echo reduction in hands free systems: A survey," *IEEE Trans. Speech Audio Processing*, vol. 9, pp 808-820, November 2001; R. Martin, J. Altenhoner, "Coupled Adaptive Filters for Acoustic Echo Control and Noise Reduction," *Proc. ICASSP* 95, pp. 3043-3046, May 1995; M. R. Petraglia, R. G. Alves, P. S. R. Diniz, "New Structures for Adaptive Filtering in Subbands with Critical Sampling," *IEEE Transactions on Signal Processing*, Vol. 48, No. 12, December 2000; M. R. Petraglia, R. G. Alves, P. S. R. Diniz, "Convergence Analysis of an Oversampled Subband Adaptive Filtering Structure with Local Errors," *Proc. IEEE Int. Symp. on Circuits and Systems* (ISCAS), May 2000.

For the foregoing reasons, there is a need for an improved method and system for clear signal capture that provides a practical solution to this evolving complex problem.

SUMMARY OF THE INVENTION

It is an object of the invention to provide an improved method and system for clear signal capture. The improved method and system comprehend several individual aspects that address specific problems in improved ways. In addition, the improved method and system also comprehend a hands free implementation that is a practical solution to a very complex problem.

In carrying out the invention, a method and system for clear signal capture are provided. The method and system comprehend several individual aspects that address specific problems in improved ways.

In one aspect of the invention, an improved technique is used to implement acoustic echo cancellation (AEC) and noise cancellation (NC). This aspect involves using a frequency domain approach for both AEC and NC. Preferably, the input microphone signal and the speaker signal are split into subbands for independent processing.

More specifically, a method of acoustic echo cancellation (AEC) and noise cancellation (NC) is provided. A microphone signal resulting from an unobservable signal corrupted by additive background noise (the near-end component) and an acoustic echo (the far-end component which is the speaker signal modified by the acoustic path) is processed in an attempt to restore the unobservable signal. At a more detailed level, the original microphone signal in the time domain is processed by an analysis filter bank to result in a frequency domain representation of the microphone signal. The speaker signal is also processed by an analysis filter bank to result in a frequency domain representation of the speaker signal. The (frequency domain) speaker signal is processed by an adaptive filter that models the echo path. The (frequency domain) microphone signal is processed by a noise cancellation filter. The output of the adaptive filter is processed by a copy of the noise cancellation filter. The outputs of the noise cancellation filter and filter copy are compared using subtraction to determine an error, and the adaptive filter that models the echo path is adapted based on the error.

This approach allows the converging adaptive filter to have the benefit of noise cancelling before comparing so that the adaptive filter can better model the echo path. A second noise cancellation filter is applied to an echoless signal that is obtained by directly comparing the adaptive filter output to the microphone signal. In this way, the adaptive filter tracking benefits from the first noise cancellation filter and its copy, and the second noise cancellation filter is applied to an echoless signal obtained via direct comparison to provide the estimation of the unobservable signal.

In one aspect of the invention, an improved technique is used to implement noise cancellation. A method of frequency domain-based noise cancellation is provided. A noisy signal resulting from an unobservable signal corrupted by additive background noise is processed in an attempt to restore the unobservable signal. The method comprises estimating background noise power with a recursive noise power estimator having an adaptive time constant, and applying a filter based on the background noise power estimate in an attempt to restore the unobservable signal.

Preferably, the background noise power estimation technique considers the likelihood that there is no speech power in the current frame and adjusts the time constant accordingly. In this way, the noise power estimate tracks at a lesser rate when the likelihood that there is no speech power in the current frame is lower. In any case, since background noise is a random process, its exact power at any given time fluctuates around its average power.

To avoid musical or watery noise that would occur due to the randomness of the noise particularly when the filter gain is small, the method further comprises smoothing the variations in a preliminary filter gain to result in an applied filter gain having a regulated variation. Preferably, an approach is taken that normalizes variation in the applied filter gain. To achieve an ideal situation, the average rate should be proportional to the square of the gain. This will reduce the occurrence of musical or watery noise and will avoid ambiance. In one approach, a pre-estimate of the applied filter gain is the basis for normalizing the adaption rate.

In one aspect of the invention, an improved technique is used to address the divergence of the adaptive filter algorithm. A method of acoustic echo cancellation (AEC) is provided. A microphone signal resulting from an unobservable signal corrupted by additive background noise (the near-end component) and an acoustic echo (the far-end component which is the speaker signal modified by the acoustic path) is processed in an attempt to restore the unobservable signal. The speaker signal is processed by an adaptive filter that models the echo path. The output of the adaptive filter and the microphone signal are compared by subtraction to determine an error, and the adaptive filter that models the echo path is adapted based on the error to allow the adaptive filter to converge.

The approach of this method allows the converging adaptive filter to achieve an optimal balance between dynamic tracking ability and filter divergence control. In addition, gain control may be independently performed in each subband.

The method comprises controlling the adaption gain of the adaptive filter based on the ratio of far-end energy to total energy. This requires an approximation of the far-end component (or equivalently the near-end component). The result is that when far-end echo dominates, tracking occurs quickly to achieve dynamic tracking, and when near-end speech or noise dominates, tracking occurs more slowly to achieve divergence control.

At a more detailed level, a preferred approach to far-end energy approximation considers the correlation between the microphone signal and the filter output signal. The preferred adaptation gain is based on a ratio of this correlation to the expected total microphone signal energy. In more detail, the adaptation gain should be proportional to the square of this ratio.

In a most preferred approach, the adaptation gain control method includes further arrangements for handling exception conditions that may be present in certain applications. In these exceptions, what happens is that the far-end energy is underestimated. This could happen at system reset or when the echo path gain suddenly increases. Exception conditions are handled by assuring that the adaption rate is not overly diminished due to the resultant underestimation of the energy ratio.

In another aspect of the invention, a method of residual echo reduction (RERF) is provided. This method is performed after the initial acoustic echo cancellation is performed. The target signal to the residual echo reduction filter is the main AEC filter output. The RERF is also an adaptive filter algorithm and the RERF input signal is the system input signal or alternatively a function thereof that hastens convergence of the RERF adaptation.

In this way, the RERF gain effectively converges toward zero when the system input signal is mostly far-end echo causing the AEC output to converge toward zero. On the other hand, when the microphone input is mostly speech, the AEC output reflects the system input and the RERF effectively approaches unity (in the case where RERF input is the same as the microphone input). The resultant gain of the RERF is then applied directly to the AEC output signal to reduce residual echo present at the AEC output signal.

At a more detailed level, this aspect of the invention comprehends controlling the RERF adaptation rate. The method comprehends a RERF adaptation rate step size control applied to the filter gain constant. The step size control is based on a weighted average of the previous gain and a look ahead. The weighting of the look ahead increases as frequency increases and provides greater flexibility at higher frequencies.

In yet another aspect of the invention, a divergence control method protects the output of the system from rare divergence of the adaptive algorithm. The method is based on conservation of energy.

The method may be used at any of the adaptive filters. At a more detailed level, the method involves comparing the energy of the filter output signal to the energy of the target signal. The filter output signal should have less energy than the target signal. In the event that it is concluded based on the energy comparison that the filter has diverged, the target signal bypasses the error signal and becomes the stage output.

In another aspect of the invention, a hands-free implementation may involve any combinations of the various individual aspects that address specific problems. But it is to be appreciated that these individual aspects each are useful alone, as well as in combinations.

DETAILED DESCRIPTION OF THE PREFERRED EMBODIMENT

Figure 2:
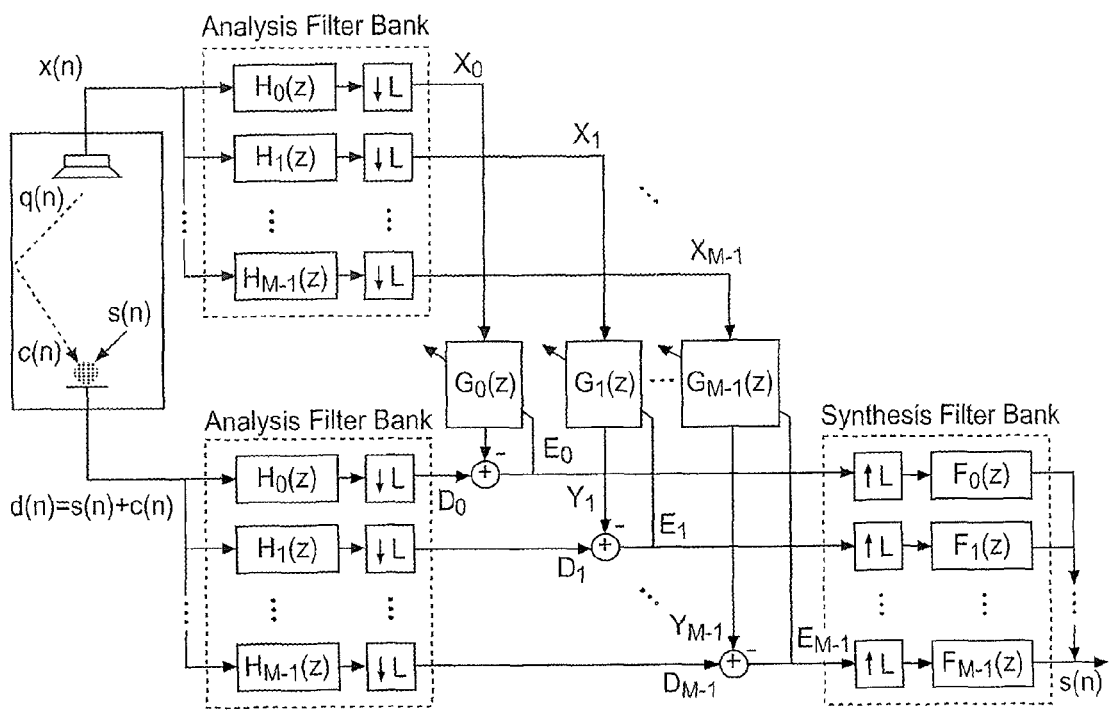
FIG. 2 illustrates a subband adaptive filter structure.
Figure 3:
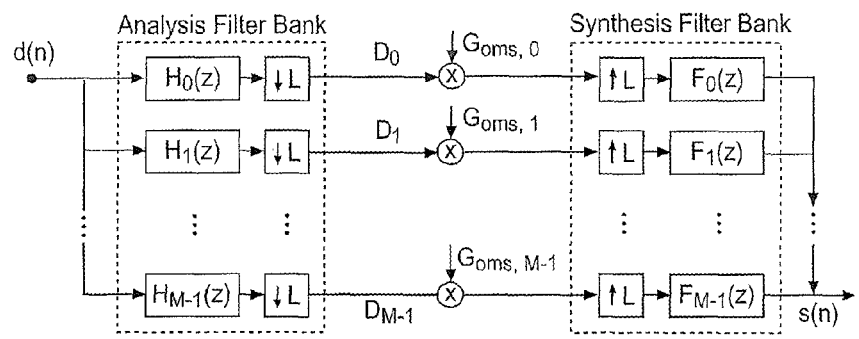
FIG. 3 illustrates a noise cancellation algorithm.

FIG. 2 illustrates a subband adaptive filter structure. The adaptive filter algorithm used is the second-order DRNLMS in the frequency domain. The noise cancellation algorithm is illustrated in FIG. 3, and is also implemented in the frequency domain. In this way, both the speaker and microphone signals are split into frequency subbands, the AEC and NC are implemented in frequency domain, and the output signal is transformed back to the time domain.

With continuing reference to FIG. 2, the subband adaptive filter structure used to implement the NLMS in subbands consists of two analysis filter banks, which split the speaker (x(n)) and microphone (d(n)) signals into M bands each. The subband signals are modified by an adaptive filter, after being decimated by a factor L, and the coefficients of each subfilter ($G_i$) are adapted independently using the individual error signal of the corresponding band ($E_i$). In order to avoid aliasing effects, this structure uses a down-sampling factor L smaller than the number of subbands M. The analysis and synthesis filter banks can be implemented by uniform DFT filter banks, so that the analysis and synthesis filters are shifted versions of the low-pass prototype filters, i.e.

$$H_i(z) = H_0(zW_M^i)$$

$$F_i(z) = F_0(zW_M^i)$$

with i=0, 1, ..., M−1, where $H_0(z)$ and $F_0(z)$ are the analysis and synthesis prototype filters, respectively, and $$W_M = e^{-j\frac{2\pi}{M}}.$$

Uniform filter banks can be efficiently implemented by the Weighted Overlap-Add (WOA) method.

The coefficient update equation for the subband structure of FIG. 2, based on the NLMS algorithm, is given by:

$$\underline{G}_i(k+1) = \underline{G}_i(k) + \mu_i(k)[\underline{X}_i^*(k)E_i(k)]$$

where '*' represents the conjugate value of $\underline{X}_i(k)$, and:

$$E_i(k) = D_i(k) - Y_i(k)$$

$$Y_i(k) = \underline{X}_i^T(k)\underline{G}_i(k)$$

$$\mu_i(k) = \frac{\mu}{P_i(k)}$$

are the error signal, the output of the adaptive filter and the step-size in each subband, respectively.

Note that the step size appears normalized by the power of the reference signal. Note also that μ is a constant real value, and $P_i(k)$ is the power estimate of the reference signal $X_i(k)$, which can be obtained recursively by the equation:

$$P_i(k+1) = \beta P_i(k) + (1-\beta)|X_i(k)|^2$$

for 0<β<1.

A few observations of the illustrated subband adaptive filter can be made. If the system to be identified has N coefficients in fullband, each subband adaptive filter ($G_i(k)$) will be a column vector with N/L complex coefficients, as well as $\underline{X}_i(k)$. $D_i(k)$, $X_i(k)$, $Y_i(k)$ and $E_i(k)$ are complex numbers. The choice of N is related to the tail length of the echo signal to cancel, for example, if fs=8 kHz, and the desired tail length is 64 ms, N=8000*0.064=512 coefficients, for the time domain fullband adaptive filter. β is related to the number of coefficients of the adaptive filter ((N−L)/N). The number of subbands for real input signals is M=(Number of FFT points)/2+1.

The previous equations describe the NLMS in subband, to obtain the DRNLMS it is required to compute the "new" error signal ($E_i(k)$) using the updated values of the subband adaptive filter coefficients, and to update again the coefficients of the subband adaptive filters, it is:

$$Y_i^j(k) = \underline{X}_i^T(k)\underline{G}_i^{j-1}(k)$$

$$E_i^j(k) = D_i(k) - Y_i^j(k)$$

$$\mu_i^j(k) = \frac{\mu^j}{P_i(k)}$$

$$\underline{G}_i^j(k) = \underline{G}_i^{j-1}(k) + \mu_i^j(k)[\underline{X}_i^*(k)E_i^j(k)]$$

where j=2, ... R represents the number of reuses that are in the algorithm, also known as order of the algorithm. Observe that $$\underline{G}_i^1(k) = \underline{G}_i(k)\mu_i^1(k) = \mu_i(k)E_i^1(k) = E_i(k)$$

and $$Y_i^1(k) = Y_i(k)$$

With continuing reference to FIG. 3, the noise cancellation algorithm considers that a speech signal s(n) is corrupted by additive background noise v(n), so the resulting noisy speech signal d(n) can be expressed as $$d(n) = s(n) + v(n).$$

Ideally, the goal of the noise cancellation algorithm is to restore the unobservable s(n) based on d(n). Unlike the AEC problem, where what needs to be removed from the microphone signal is unambiguous, the noise cancellation problem is usually not as well defined. For the purpose of this noise cancellation algorithm, the background noise is defined as the quasi-stationary noise that varies at a much slower rate compared to the speech signal.

The noise cancellation algorithm is a frequency-domain based algorithm. With a DFT analysis filter bank with length (2M−2) DFT, the noisy signal d(n) is split into M subband signals, $D_i(k)$, i=0, 1 ..., M−1, with the center frequencies uniformly spaced from DC to Nyquist frequency. Except the DC and the Nyquist bands (bands 0 and M−1, respectively), all other subbands have equal bandwidth which equals to 1/(M−1) of the overall effective bandwidth. In each subband, the average power of quasi-stationary background noise is tracked, and then a gain is decided accordingly and applied to the subband signals. The modified subband signals are subsequently combined by a DFT synthesis filter bank to generate the output signal. When combined with other frequency-domain modules (AEC for example), the DFT analysis and synthesis banks are moved to the front and back of all modules, respectively.

Because it is assumed that the background noise varies slowly compared to the speech signal, its power in each subband can be tracked by a recursive estimator $$P_{NZ,i}(k) = (1-\alpha_{NZ})P_{NZ,i}(k-1) + \alpha_{NZ}|D_i(k)|^2$$
$$= P_{NZ,i}(k-1) + \alpha_{NZ}(|D_i(k)|^2 - P_{NZ,i}(k-1))$$

where the parameter $\alpha_{NZ}$ is a constant between 0 and 1 that decides the weight of each frame, and hence the effective average time. The problem with this estimation is that it also includes the power of speech signal in the average. If the speech is not sporadic, significant over-estimation can result. To avoid this problem, a probability model of the background noise power is used to evaluate the likelihood that the current frame has no speech power in the subband. When the likelihood is low, the time constant $\alpha_{NZ}$ is reduced to drop the influence of the current frame in the power estimate. The likelihood is computed based on the current input power and the latest noise power estimate:

$$L_{NZ,i}(k) = \frac{|D_i(k)|^2}{P_{NZ,i}(k-1)} \exp\left(1 - \frac{|D_i(k)|^2}{P_{NZ,i}(k-1)}\right)$$

and the noise power is estimated as $$P_{NZ,i}(k) = P_{NZ,i}(k-1) + (\alpha_{NZ}L_{NZ,i}(k))(|D_i(k)|^2 - P_{NZ,i}(k-1)).$$

It can be observed that $L_{NZ,i}(k)$ is between 0 and 1. It reaches 1 only when $|D_i(k)|^2$ is equal to $P_{NZ,i}(k-1)$, and reduces towards 0 when they become more different. This allows smooth transitions to be tracked but prevents any dramatic variation from affecting the noise estimate.

In practice, less constrained estimates are computed to serve as the upper- and lower-bounds of $P_{NZ,i}(k)$. When it is detected that $P_{NZ,i}(k)$ is no longer within the region defined by the bounds, it is adjusted according to these bounds and the adaptation continues. This enhances the ability of the algorithm to accommodate occasional sudden noise floor changes, or to prevent the noise power estimate from being trapped due to inconsistent audio input stream.

In general, it can be assumed that the speech signal and the background noise are independent, and thus the power of the microphone signal is equal to the power of the speech signal plus the power of background noise in each subband. The power of the microphone signal can be computed as $|D_i(k)|^2$. With the noise power available, an estimate of the speech power is $$P_{SP,i}(k) = \max(|D_i(k)|^2 - P_{NZ,i}(k), 0)$$

and therefore, the optimal Wiener filter gain can be computed as $$G_{T,i}(k) = \max\left(1 - \frac{P_{NZ,i}(k)}{|D_i(k)|^2}, 0\right).$$

However, since the background noise is a random process, its exact power at any given time fluctuates around its average power even if it is stationary. By simply removing the average noise power, a noise floor with quick variations is generated, which is often referred to as musical noise or watery noise. This is the major problem with algorithms based on spectral subtraction. Therefore, the instantaneous gain $G_{T,i}(k)$ needs to be further processed before being applied.

When $|D_i(k)|^2$ is much larger than $P_{NZ,i}(k)$, the fluctuation of noise power is minor compared to $|D_i(k)|^2$, and hence $G_{T,i}(k)$ is very reliable. On the other hand, when $|D_i(k)|^2$ approximates $P_{NZ,i}(k)$, the fluctuation of noise power becomes significant, and hence $G_{T,i}(k)$ varies quickly and is unreliable. In accordance with an aspect of the invention, more averaging is necessary in this case to improve the reliability of gain factor. To achieve the same normalized variation for the gain factor, the average rate needs to be proportional to the square of the gain. Therefore the gain factor $G_{oms,i}(k)$ is computed by smoothing $G_{T,i}(k)$ with the following algorithm:

$$G_{oms,i}(k) = G_{oms,i}(k-1) + (\alpha_G G_{0,i}^2(k))(G_{T,i}(k) - G_{oms,i}(k-1))$$
$$G_{0,i}(k) = G_{oms,i}(k-1) + 0.25 \times (G_{T,i}(k) - G_{oms,i}(k-1))$$

where $\alpha_G$ is a time constant between 0 and 1, and $G_{0,i}(k)$ is a pre-estimate of $G_{oms,i}(k)$ based on the latest gain estimate and the instantaneous gain. The output signal can be computed as $$\hat{S}(k) = G_{oms,i}(k) \times D_i(k).$$

It can be observed that $G_{oms,i}(k)$ is averaged over a long time when it is close to 0, but is averaged over a shorter time when it approximates 1. This creates a smooth noise floor while avoiding generating ambient speech.

Figure 4:
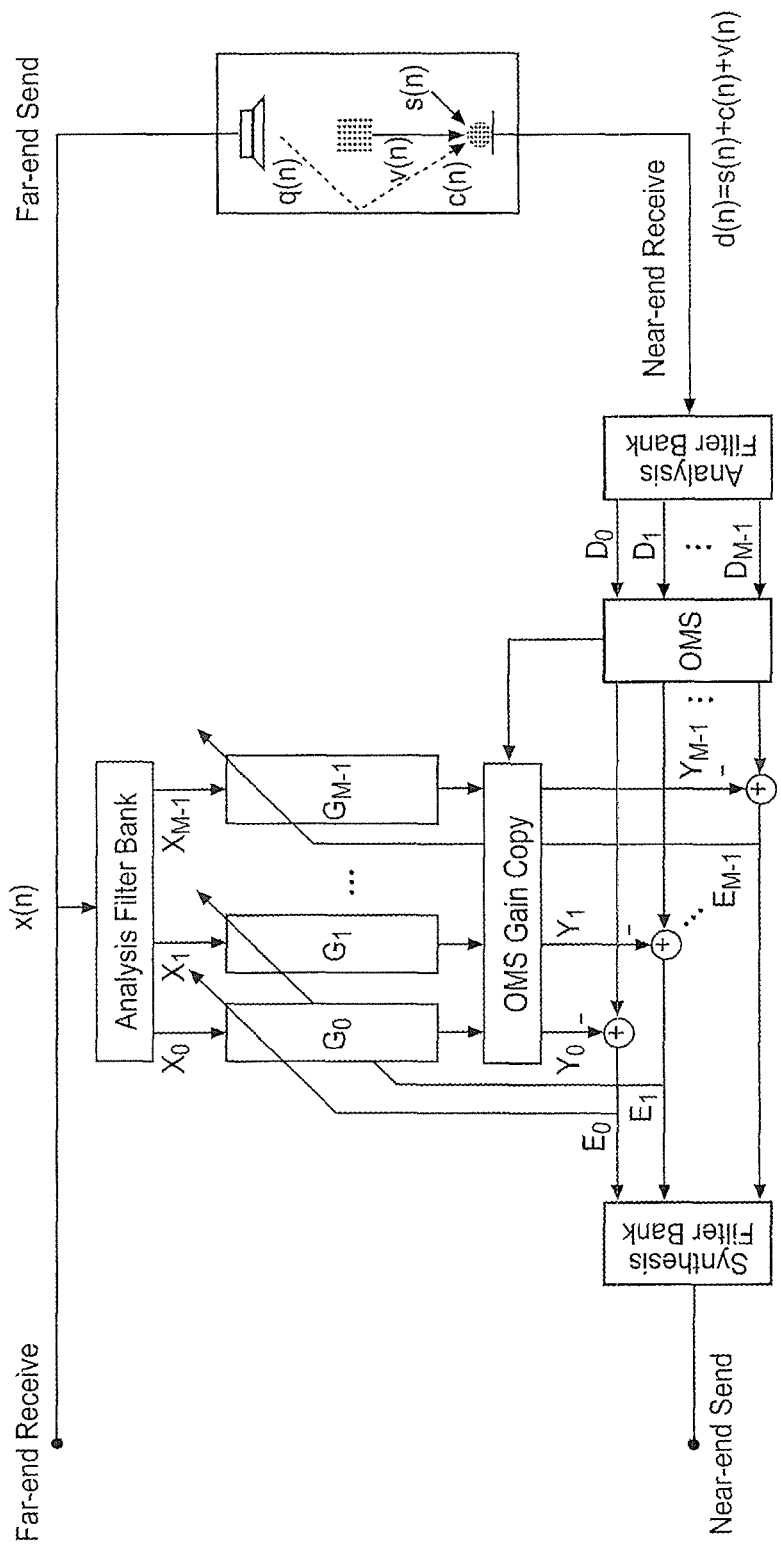
FIG. 4 illustrates an arrangement that optimizes the AEC algorithm performance.

FIG. 4 illustrates the subband adaptive filter structure and the noise cancellation algorithm arranged to optimize AEC performance.

Figure 1:
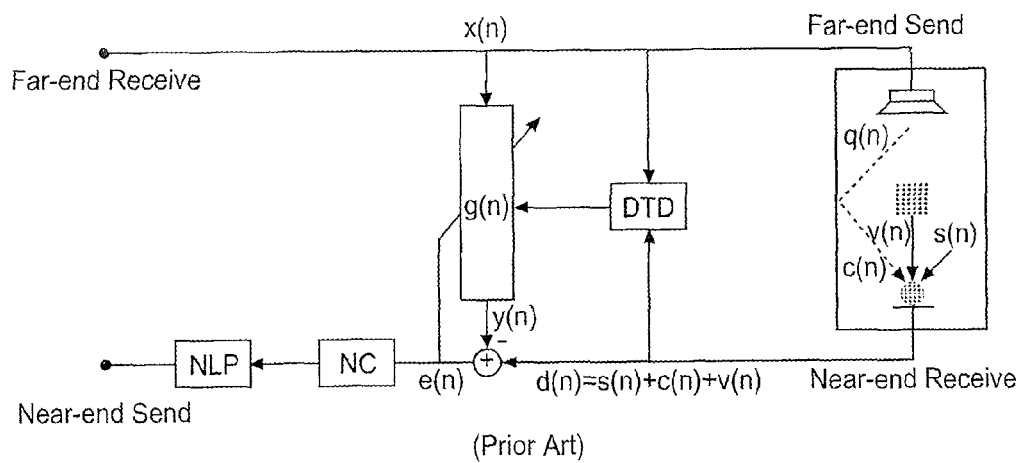
FIG. 1 illustrates a prior art hands free implementation.

Considering the prior art system shown in FIG. 1, the adaptive filter algorithm comes first and the noise cancellation implementation follows. It is realized in this way because historically the adaptive filter algorithm is realized in time domain, and the noise cancellation algorithm is realized in frequency domain. Changing the order of the adaptive filter and the noise cancellation algorithms would introduce a delay at the microphone signal path caused by the NC algorithm and would also introduce a non-linearity caused by the NC algorithm. The adaptive filter cannot compensate non-linearity (because it is a linear system (FIR filter)).

The arrangement of FIG. 4 overcomes these limitations by implementing the NC algorithm first and then the adaptable filter algorithm second. In this way, environmental noise is removed and the convergence rate of the adaptive filter algorithm and also the maximum echo return loss enhancement (ERLE) obtained by the system will be increased.

By placing a copy of the OMS gain coefficients at the output of the subband adaptive filters, the non-linearity introduced by the OMS gain coefficients at the microphone input is compensated. In addition, by implementing the subband adaptive filter structure and noise cancellation algorithm in the frequency domain, time delay problems can be avoided.

Figure 5:
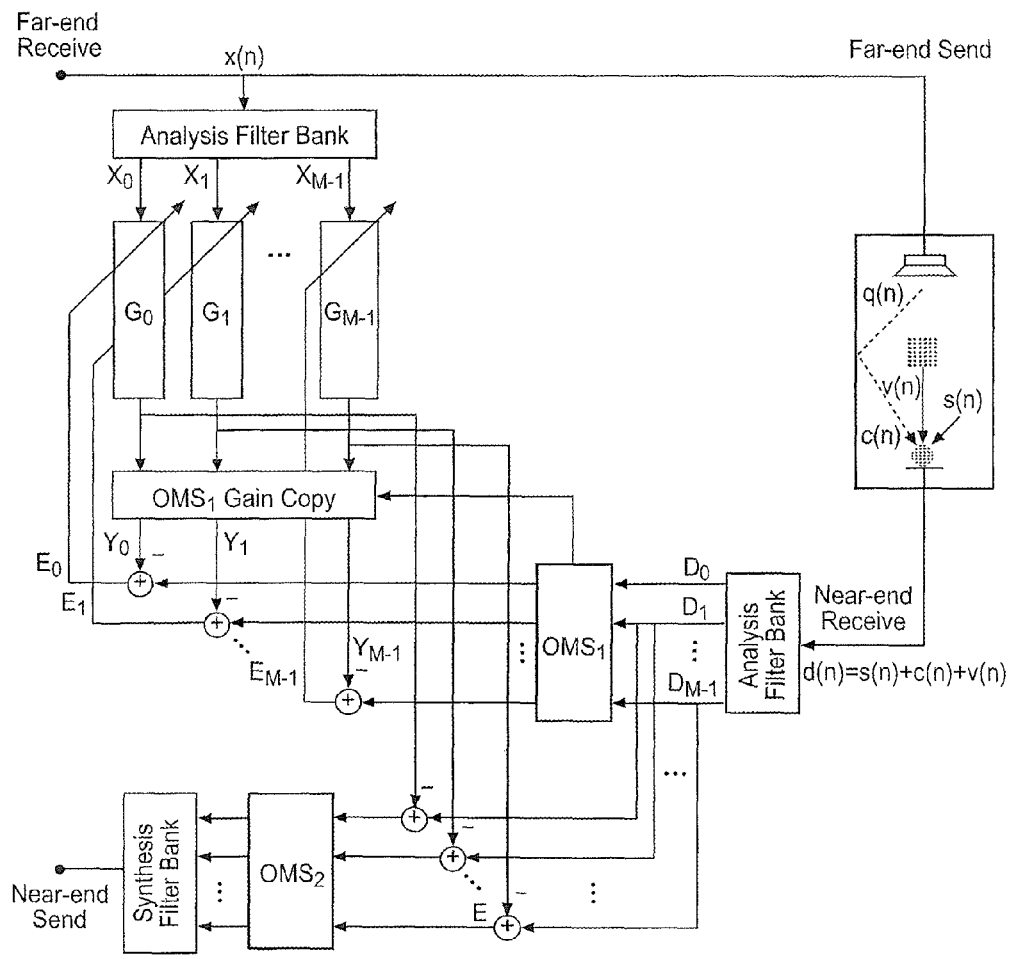
FIG. 5 illustrates an arrangement that optimizes the AEC and NC algorithms performance.

FIG. 5 illustrates the subband adaptive filter structure and the noise cancellation algorithm arranged to optimize AEC and NC performance. FIG. 4 illustrates the AEC improvement achieved by placing the NC algorithm before the AEC algorithm, but from the NC algorithm point of view, the NC algorithm could perform better if applied after removal of the echo. The FIG. 5 arrangement optimizes both algorithms at the same time. As shown, a second NC algorithm ($OMS_2$ block) is performed in an echoless signal. That is, the adaptive filter benefits from the presence of the $OMS_1$ and $OMS_1$ copy blocks while the $OMS_2$ block benefits from the adaptive filter. In this way, the output from the $OMS_2$ block benefits significantly in terms of AEC and NC performance.

From the acoustic model illustrated in FIG. 5, the microphone signal d(n) can be decomposed as $$d(n) = d_{ne}(n) + d_{fe}(n)$$

where the near-end component $d_{ne}(n)$ is the sum of the near-end speech $s(n)$ and background noise $v(n)$, and the far-end component $d_{fe}(n)$ is the acoustic echo, which is the speaker signal modified by the acoustic path: $c(n) = q(n) \otimes x(n)$. The NLMS filter estimates the acoustic path by matching the speaker signal ($x(n)$) to the microphone signal ($d(n)$) through correlation. Because it is assumed that both near-end speech and background noise are uncorrelated to the reference signal, the adaptive filter should converge to the acoustic path $q(n)$.

However, since the NLMS is a gradient-based adaptive algorithm that approximates the actual gradients by single samples, the filter coefficients drift around the ideal solutions even after the filter converges. The range of drifting, or misadjustment, depends mainly on two factors: adaptation gain constant $\mu$ and the energy ratio between near-end and far-end components.

The misadjustment plays an important role in AEC performance. When near-end speech or background noise is present, this increases the near-end to far-end ratio, and hence increases the misadjustment. Thus the filter coefficients drift further away from the ideal solution, and the residual echo becomes louder as a result. This problem is usually referred to as divergence.

Traditional AEC algorithms deal with the divergence problem by deploying a state machine that categorizes the current event into one of four categories: silence (neither far-end nor near-end speech present), receive-only (only far-end speech present), send-only (only near-end speech present), and double-talk (both far-end and near-end speech present). By adapting filter coefficients during the receive-only state and halting adaptation otherwise, the traditional AEC algorithm prevents divergence due to the increase in near-end to far-end ratio. Because the state machine is based on the detection of voice activities at both ends, this method is often referred to as double-talk detection (DTD).

Although working nicely in many applications, the DTD inherits two fundamental problems. First of all, it completely ignores the near-end background noise as a factor. Secondly, it only allows filter adaptation in the receive-only state, and thus cannot handle any echo path variation during other states. The DTD can get away with these problems when the background noise level is ignorable and the near-end speech is sporadic. However, when background noise becomes significant, not only the accuracy of state detection suffers, the balance between dynamic tracking and divergence prevention also becomes difficult. Therefore, a lot of tuning effort is necessary for a traditional DTD-based system, and system robustness is often a problem.

Furthermore, the traditional DTD-based system often manipulates the output signal according to the detected state in order to achieve better echo reduction. This often results in half-duplex like performance in noisy conditions.

To overcome the deficiency of the traditional DTD, a more sophisticated double-talk control is used in order to achieve better overall AEC performance. As discussed above, the misadjustment mainly depends on two factors: adaptation gain constant and near-end to far-end ratio. Therefore, using adaptation gain constant as a counter-balance to the near-end to far-end ratio can keep the misadjustment at a constant level and thus reduce divergence. To achieve this, it is necessary that $$\mu \propto \left( \frac{\text{far-end energy}}{\text{total energy}} \right)^2 = \left( \frac{E\{|d_{fe}(n)|^2\}}{E\{|d(n)|^2\}} \right)^2.$$

When there is no near-end component, the filter adaptation is allowed to proceed at full speed. As the near-end to far-end ratio increases, the filter adaptation slows down accordingly. Finally, when there is no far-end component, the filter adaptation is halted since there is no information about the echo path available. Theoretically, this strategy achieves optimal balance between dynamic tracking ability and filter divergence control. Furthermore, because the adaptive filter in each subband is independent from the filters in other subbands, this gain control decision can be made independent in each subband and becomes more efficient.

The major obstacle of this strategy is the availability of the far-end (or equivalently, near-end) component. With access to these components, there would be no need for an AEC system. Therefore, an approximate form is used in the adaptation gain control:

$$\mu_i \frac{|E\{D_i(k)Y_i^*(k)\}|^2}{E\{|D_i(k)|^2\}^2} \gamma$$

where $\gamma$ is a constant that represents the maximum adaptation gain. When the filter is reasonably close to converging, $Y_i(k)$ would approximate the far-end component in the i-th subband, and therefore, $E\{D_i(k)Y^*_i(k)\}$ would approximate the far-end energy. In practice, it should be noted that the energy ratio should be limited to its theoretical range bounded by 0 and 1 (inclusively). This gain control decision works effectively in most conditions, with two exceptions which will be addressed in the subsequent discussion.

From the discussion above, $E\{D_i(k)Y^*_i(k)\}$ approximates the energy of the far-end component only when the adaptive filter converges. This means that over- or under-estimation of the far-end energy can occur when the filter is far from convergence. However, increased misadjustment, or divergence, is a problem only after the filter converges, so over-estimating the far-end energy actually helps accelerating the convergence process without causing a negative trade-off. On the other hand, under-estimating the far-end energy slows down or even paralyzes the convergence process, and therefore is a concern with the aforementioned gain control decision.

Specifically, under-estimation of far-end energy happens when $E\{D_i(k)Y^*_i(k)\}$ is much smaller than the energy of far-end component, $E\{|D_{fe,i}(k)|^2\}$. By analyzing all possible scenarios, under-estimating mainly happens in the following two situations: (1) When the system is reset, with all filter coefficients initialized as zero, $Y_i(k)$ would be zero. This leads to the adaptation gain $\mu$ being zero and the adaptive system being trapped as a result. (2) When the echo path gain suddenly increases, the $Y_i(k)$ computed based on the earlier samples would be much weaker than the actual far-end component. This can happen when the distance between speaker and microphone is suddenly reduced. Additionally, if the reference signal passes through an independent volume controller before reaching the speaker, the volume control gain would also figure into the echo path. Therefore turning up the volume would also increase echo path gain drastically.

Figure 6:
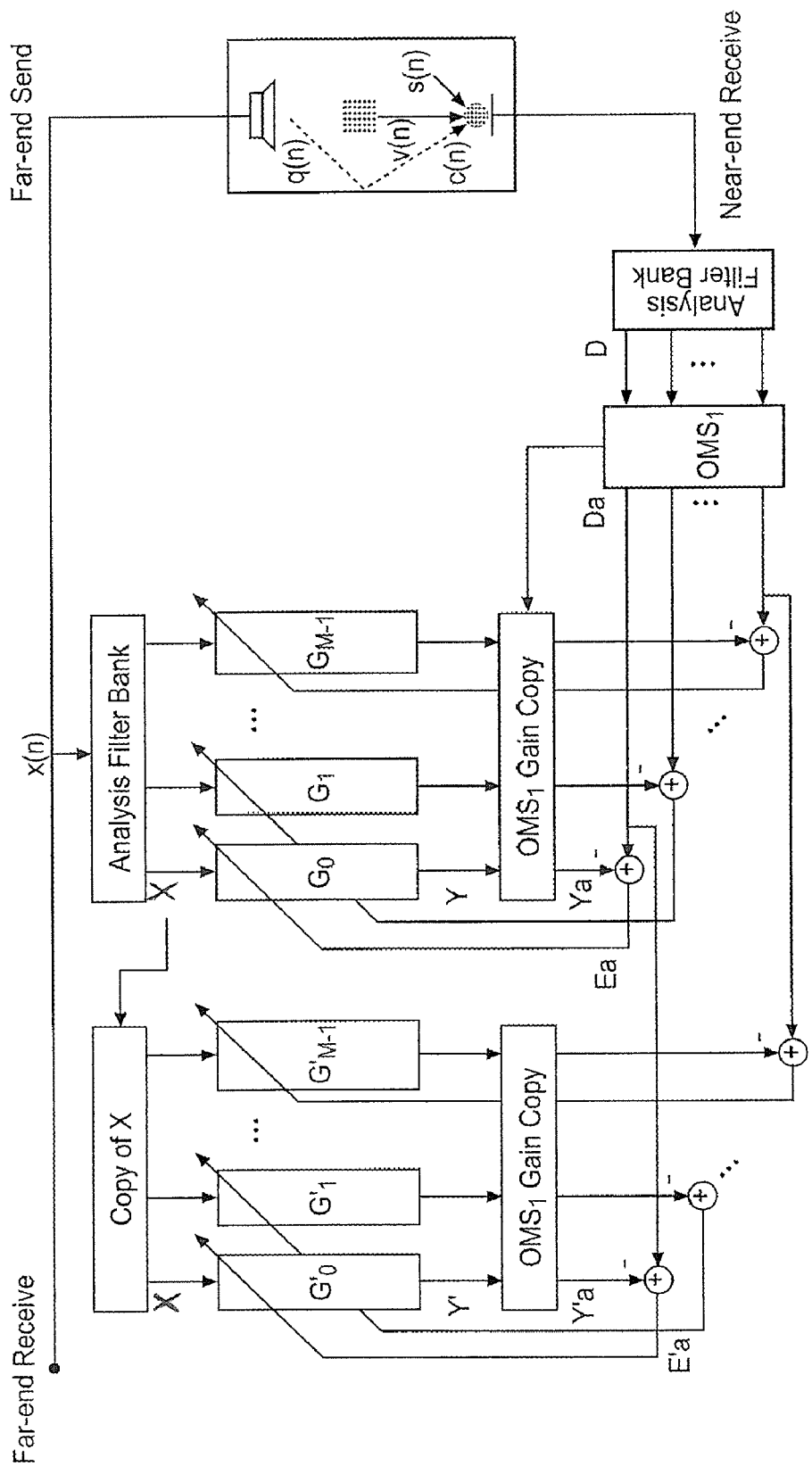
FIG. 6 illustrates main and auxiliary adaptive filters in an arrangement that overcomes deficiencies of a traditional DTD arrangement.

For the first situation, the adaptation gain control is suspended for a short interval right after the system reset, which helps kick-start the filter adaptation. For the second situation, an auxiliary filter ($\underline{G'}_i(k)$) is introduced to relieve the underestimation problem. The auxiliary filter is a plain subband NLMS filter which is parallel to the main filter, as illustrated in FIG. 6, and with the number of taps being enough to cover the main echo path. Its adaptation gain constant should be small enough such that no significant divergence would result without any adaptation gain or double-talk control mechanism. After each adaptation, the 2-norms of the main and auxiliary filters in each subband are computed:

$$SqGa_i(k)=\|\underline{G}_i(k)\|_2$$

$$SqGb_i(k)=\|\underline{G}'_i(k)\|_2$$

which are estimates of echo path gain from both filters, respectively. Since the auxiliary filter is not constrained by the gain control decision, it is allowed to adapt freely all of the time. The under-estimation factor of the main filter can be estimated as $$RatSqG_i = \min\left(\frac{SqGa_i(k)}{SqGb_i(k)}, 1\right)$$

and the double-talk based adaptation gain control decision can be modified as $$\mu_i = \min\left(\frac{|E\{D_i(k)Y_i^*(k)\}|^2}{E\{|D_i(k)|^2\}^2 \times RatSqG_i}, 1\right)\gamma.$$

It can be observed that the auxiliary filter only affects system performance when its echo path gain surpasses that of the main filter. Furthermore, it only accelerates the adaptation of the main filter because $RatSqG_i$ is limited between 0 and 1.

As discussed previously, the acoustic echo cancellation problem is approached based on the assumption that the echo path can be modeled by a linear finite impulse response (FIR) system, which means that the far-end component received by the microphone is the result of the speaker signal transformed by an FIR filter. The AEC filter uses a subband NLMS-based adaptive algorithm to estimate the filter from the speaker and microphone signals in order to remove the far-end component from the microphone signal.

It can be observed that a residual echo is usually left in the output of the adaptive filter. Many factors can contribute to this. First of all, the linear FIR model might not be exactly satisfied. In addition, the echo path might be time-varying, which makes the adaptive filter lag behind no matter how fast it adapts. Finally, the misadjustment of the adaptive filter results in filter estimation error even if the model is perfect, the echo path is time-invariant, and the algorithm is fully converged. This residual echo usually makes the AEC performance unsatisfactory. Therefore, further attenuating the residual echo without significantly damaging the near-end speech is desired.

Figure 7:
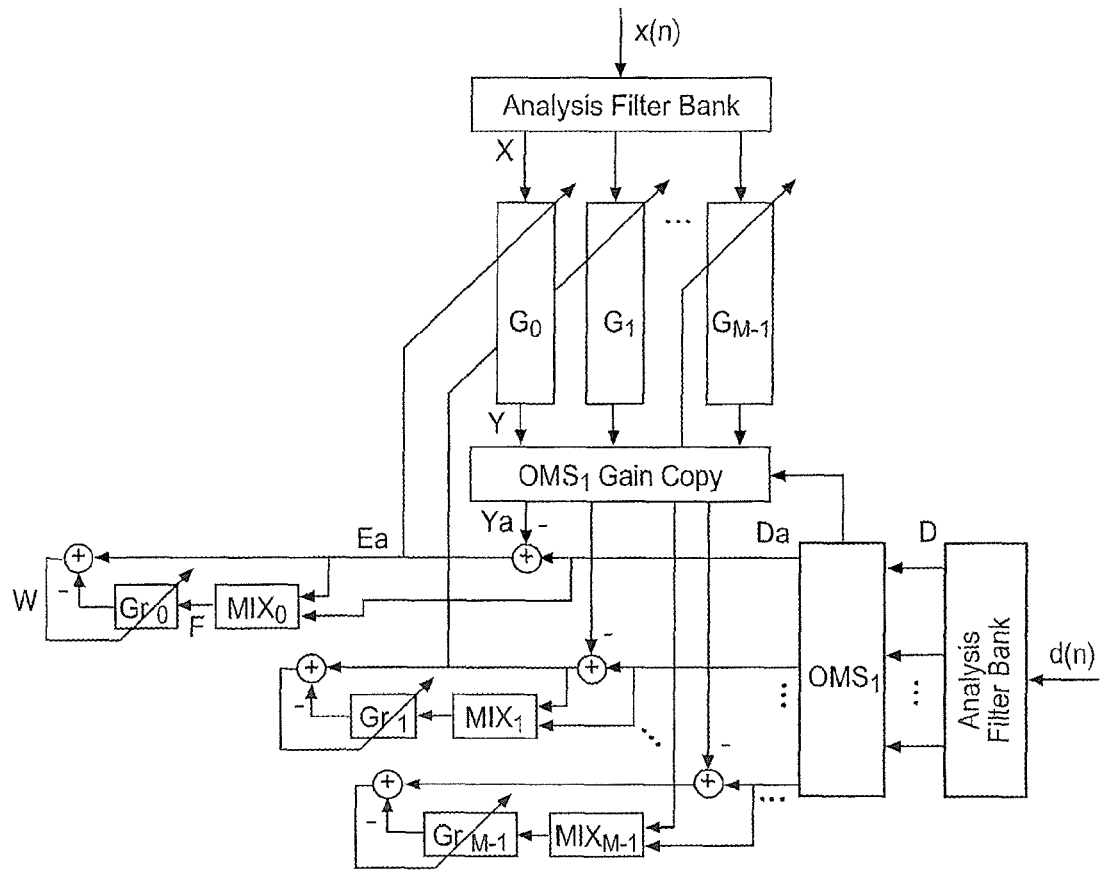
FIG. 7 illustrates a residual echo reduction filter.

A residual echo reduction (RER) filter is illustrated in FIG. 7 and is used to achieve this goal. Following the overall system structure, it works in each subband independently. For each subband, a one-tap NLMS filter is implemented with the main AEC filter output ($E_i(k)$) as the ideal signal. If the microphone signal ($D_i(k)$) is used as the reference signal, the one-tap filter will converge to $$G_{r,i}(k) = \frac{E\{E_i(k)D_i^*(k)\}}{E\{|D_i(k)|^2\}}.$$

When the microphone signal contains mostly far-end component, most of it should be removed from $E_i(k)$ by the main AEC filter and thus the absolute value of $G_{r,i}(k)$ should be close to 0. On the other hand, when the microphone signal contains mostly near-end component, $E_i(k)$ should approximate $D_i(k)$, and thus $G_{r,i}(k)$ is close to 1. Therefore, by applying $|G_{r,i}(k)|$ as a gain on $E_i(k)$, the residual echo can be greatly attenuated while the near-end speech is mostly intact.

To further protect the near-end speech, the input signal to the one-tap NLMS filter can be changed from $D_i(k)$ to $F_i(k)$, which is a weighted linear combination of $D_i(k)$ and $E_i(k)$ defined as $$F_i(k)=(1-R_{NE,i}(k))D_i(k)+R_{NE,i}(k)E_i(k)$$

where $R_{NE,i}(k)$ is an instantaneous estimate of the near-end energy ratio. With this change, the solution of $G_{r,i}(k)$ becomes $$G_{r,i}(k) = \frac{E\{E_i(k)F_i^*(k)\}}{E\{|F_i(k)|^2\}}.$$

It can be observed that when $R_{NE,i}(k)$ is close to 1, $F_i(k)$ is effectively $E_i(k)$, and thus $G_{r,i}(k)$ is forced to stay close to 1. On the other hand, when $R_{NE,i}(k)$ is close to 0, $F_i(k)$ becomes $D_i(k)$, and $G_{r,i}(k)$ returns to the previous definition. Therefore, the RER filter preserves the near-end speech better with this modification while achieving similar residual echo reduction performance.

Because $|G_{r,i}(k)|$ is applied as the gain on $E_i(k)$, the adaptation rate of the RER filter affects the quality of output signal significantly. If adaptation is too slow, the on-set near-end speech after echo events can be seriously attenuated, and near-end speech can become ambient as well. On the other hand, if adaptation is too fast, unwanted residual echo can pop up and the background can become watery. To achieve optimal balance, an adaptation step-size control (ASC) is applied to the adaptation gain constant of the RER filter:

$$\mu_{r,i}(k) = ASC_i(k)\gamma_r$$

$$ASC_i(k) = (1-\alpha_{ASC,i})|G_{r,i}(k-1)|^2 + \alpha_{ASC,i}\min\left(\frac{|E_i(k)|^2}{|F_i(k)|^2}, 1\right).$$

It can be observed that $ASC_i(k)$ is decided by the latest estimate of $|G_{r,i}|^2$ plus a one-step look ahead. The frequency-dependent parameter $\alpha_{ASC,i}$, which decides the weight of the one-step look ahead, is defined as $$\alpha_{ASC,i}=1-\exp(-M/(2i)), i=0,1,\ldots,(M/2)$$

where M is the DFT size. This gives more weight to the one-step look-ahead in the higher frequency subbands because the same number of samples cover more periods in the higher-frequency subbands, and hence the one-step look-ahead there is more reliable. This arrangement results in more flexibility at higher-frequency, which helps preserve high frequency components in the near-end speech.

The divergence control system basically protects the output of the system from rare divergence of the adaptive algorithm and it is based on the conservation of energy theory for each subband of the hands free system.

Figure 8:
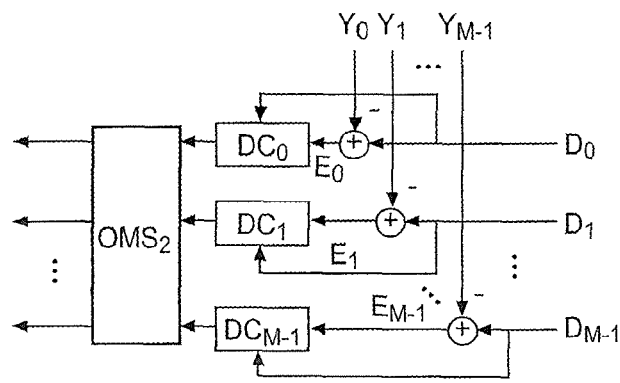
FIG. 8 illustrates a divergence control system.

FIG. 8 presents the block diagram of the divergence control system and it compares in each subband the power of the microphone signal ($D_t(k)$) with the power of the output of the adaptive filter ($Y_t(k)$). Because energy is being extracted (the echo) from the microphone signal, the power of the adaptive filter output has to be smaller than or equal to the power of the microphone signal in each subband, if this does not happen it means that the adaptive subfilter is adding energy to the system and the assumption will be that the adaptive algorithm diverged, if it occurs the output of the subtraction block ($E_t(k)$), is replaced by the microphone signal $D_t(k)$).

The divergence control system is also used for the subtraction blocks after OMS1 and before the RER calculation to improve the performance of the RER in case of divergence of the main adaptive filter.

The objective of the comfort noise generator (CNG) is to compensate for the irregularities at the noise floor in the output signal caused by the residual echo reduction. Basically for each subband an estimate of the magnitude of the noise floor before the residual echo reduction block is made, and compared with the magnitude of the signal after the residual echo reduction block. If the magnitude of the signal after the RER block is smaller than the magnitude of the signal before the RER block, a signal with the magnitude of the result of the difference between these two signals and random phase is added to the output signal, otherwise nothing is added. Observe that the CNG proposed also can compensate existing discontinuities in frequency domain on the microphone signal, which will provide an audible improvement on the quality of the system output signal.

Figure 9A:
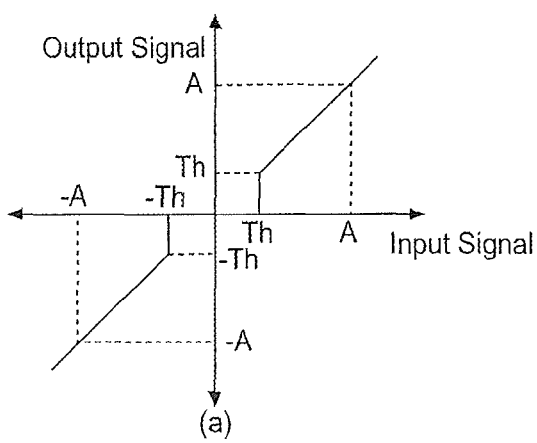
FIGS. 9A-9B illustrate a non-linear processor implementation.
Figure 9B:
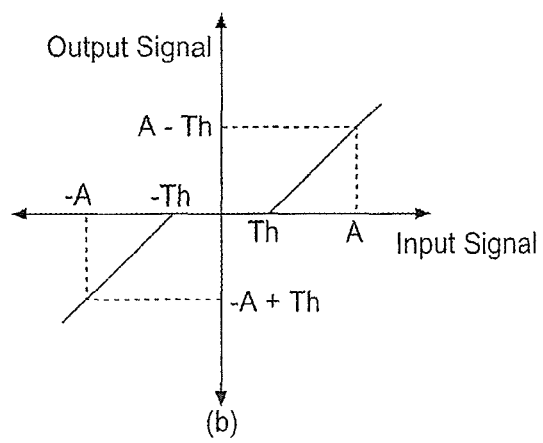

The center-clipping also known as the non linear processor (NLP) is implemented to remove some residual echo that is still present at the output signal, it works in time domain and it basically puts to zero the samples that have absolute value smaller than a predefined threshold (Th). There are two different approaches, and they are presented in FIGS. 9A-9B.

Figure 10:
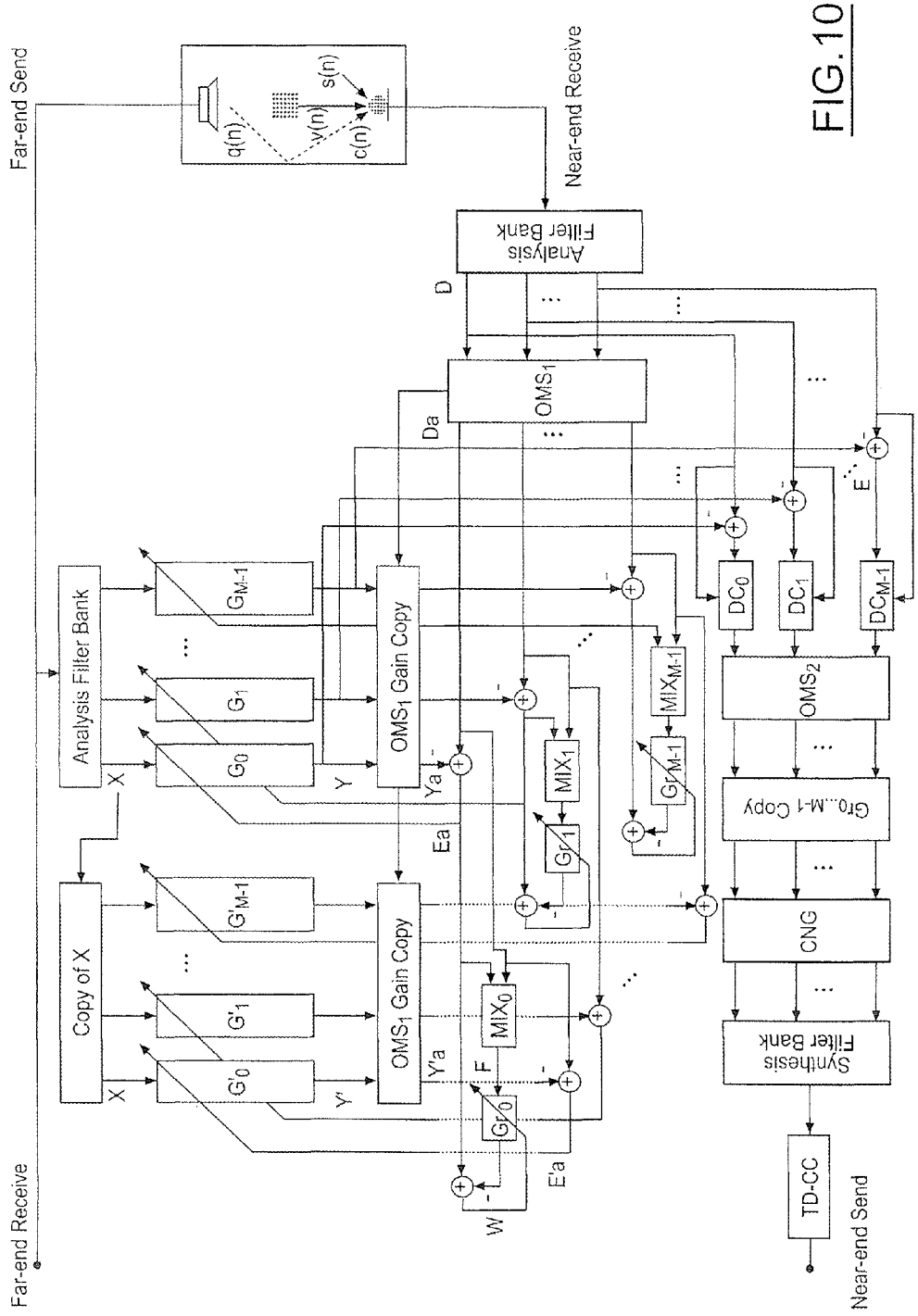
FIG. 10 illustrates a method and system for a clear signal capture in the preferred embodiment which incorporates preferred embodiments of the improved individual features.

The block diagram of the complete system is presented in FIG. 10. FIG. 10 illustrates how the different parts of the system are implemented together.

The block TD-CC represents the center-clipping implementation in time domain. The block CNG represents the comfort noise generator and it is implemented in frequency domain after the RER algorithm represented by the $Gr_{1...M-1}$ Copy block.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of dynamic tracking and filter divergence control in acoustic echo cancellation (AEC) wherein a microphone signal has a near-end component and a far-end component, the microphone signal resulting from an unobservable signal corrupted by an acoustic echo (the far-end component) and being processed in an attempt to restore the unobservable signal, the acoustic echo being a speaker signal modified by an acoustic path, wherein an adaptive filter models the echo path in the frequency domain, the method comprising:
   receiving the microphone signal;
   applying the adaptive filter to the speaker signal to produce an echo signal that models the acoustic echo;
   subtracting the echo signal from the microphone signal to produce an output signal that resembles the unobservable signal;
   estimating a ratio of a far-end component energy to a total microphone signal energy;
   adapting the adaptive filter based on the output signal, wherein an adaptation gain is based on the ratio to achieve a balance between dynamic tracking ability and filter divergence control,
   wherein the far-end component energy is estimated based on the correlation between the microphone signal and the echo signal.

2. The method of claim 1 wherein processing takes place independently in a plurality of subbands.

3. A method of dynamic tracking and filter divergence control in acoustic echo cancellation (AEC) wherein a microphone signal has a near-end component and a far-end component, the microphone signal resulting from an unobservable signal corrupted by an acoustic echo (the far-end component) and being processed in an attempt to restore the unobservable signal, the acoustic echo being a speaker signal modified by an acoustic path, wherein an adaptive filter models the echo path in the frequency domain, the method comprising:
   receiving the microphone signal;
   applying the adaptive filter to the speaker signal to produce an echo signal that models the acoustic echo;
   subtracting the echo signal from the microphone signal to produce an output signal that resembles the unobservable signal;
   estimating a ratio of a far-end component energy to a total microphone signal energy;
   adapting the adaptive filter based on the output signal, wherein an adaptation gain is based on the ratio to achieve a balance between dynamic tracking ability and filter divergence control,
   wherein the far-end component energy is estimated based on the correlation between the microphone signal and the echo signal, and
   wherein the adaptation gain is based on the square of the ratio of the far-end energy component to the total microphone signal energy.

4. The method of claim 3 further comprising:
   utilizing an auxiliary filter parallel to the adaptive filter wherein the adaption gain is further adjusted based on the auxiliary filter to compensate possible underestimation of echo.

* * * * *